United States Patent
McCann

(10) Patent No.: US 8,555,017 B2
(45) Date of Patent: Oct. 8, 2013

(54) IN-PLACE PHYSICAL TO VIRTUAL (P2V) MIGRATION OF AN EXISTING OPERATING SYSTEM DURING INSTALLATION OF A NEW OPERATING SYSTEM

(75) Inventor: William Jon McCann, Baltimore, MD (US)

(73) Assignee: Red Hat, Inc., Raleigh, NC (US)

( * ) Notice: Subject to any disclaimer, the term of this patent is extended or adjusted under 35 U.S.C. 154(b) by 649 days.

(21) Appl. No.: 12/710,321

(22) Filed: Feb. 22, 2010

(65) Prior Publication Data

US 2011/0208929 A1   Aug. 25, 2011

(51) Int. Cl.
*G06F 12/00*   (2006.01)
*G06F 9/445*   (2006.01)

(52) U.S. Cl.
USPC .......................... 711/165; 711/173; 717/174

(58) Field of Classification Search
USPC ................................................ 711/165, 173
See application file for complete search history.

(56) References Cited

U.S. PATENT DOCUMENTS

| | | | | |
|---|---|---|---|---|
| 6,920,555 | B1* | 7/2005 | Peters et al. | 713/100 |
| 2004/0117414 | A1* | 6/2004 | Braun et al. | 707/204 |
| 2004/0187104 | A1* | 9/2004 | Sardesai et al. | 717/174 |
| 2006/0010176 | A1* | 1/2006 | Armington | 707/204 |
| 2006/0089995 | A1* | 4/2006 | Kerr et al. | 709/227 |
| 2007/0214350 | A1* | 9/2007 | Isaacson | 713/2 |
| 2009/0094603 | A1* | 4/2009 | Hiltgen et al. | 718/1 |
| 2009/0113423 | A1* | 4/2009 | Hiltgen et al. | 718/1 |
| 2009/0307477 | A1* | 12/2009 | Matthew et al. | 713/2 |

OTHER PUBLICATIONS

Jones, Richard, "virt-p2v—P2V (physical to virtual machine) migration tool", Feb. 4, 2008, http://people.redhat.com/~rjones/virt-p2v/virt-p2v.1.html, Red Hat, Inc., 10 pages.
Microsoft Virtual Server 2005, Server Consolidation and Migration with the Microsoft Virtual Server 2005 Migration Toolkit, Oct. 2004, 16 pages, Microsoft Corporation.
Novell® PlateSpin® Portability Guide—User Guide, Oct. 28, 2009, 128 pages.
VMware vCenter Converter—Enterprise-class migration tool for converting physical machines to VMware virtual machines—Product Datasheet, 2009, VMware, Inc., 2 pages.

* cited by examiner

*Primary Examiner* — Sanjiv Shah
*Assistant Examiner* — Glenn Gossage
(74) *Attorney, Agent, or Firm* — Lowenstein Sandler LLP

(57) ABSTRACT

A computing device, computer readable storage medium, and method for migration of a physical machine to a virtual machine are disclosed. The computing device executes an operating system installer and generates a virtual disk image at a temporary location. The computing device copies data from one or more existing partitions on a storage device to the virtual disk image, wherein the one or more existing partitions include an existing operating system and associated data. The virtual disk image is stored at a temporary location. The one or more existing partitions are then replaced with a new partition on the storage device. A new operating system is installed on the new partition. The virtual disk image is moved to the new partition from the temporary location. The virtual disk image can then be loaded into a virtual machine that runs on the new operating system.

25 Claims, 6 Drawing Sheets

IN-PLACE PHYSICAL TO VIRTUAL (P2V) MIGRATION OF AN EXISTING OPERATING SYSTEM DURING INSTALLATION OF A NEW OPERATING SYSTEM

TECHNICAL FIELD

Embodiments of the present invention relate generally to virtualized systems, and more specifically to performing an in-place physical to virtual (P2V) migration of an existing operating system (OS) during installation of a new operating system (OS).

BACKGROUND

Typically, when a user installs a new operating system on a storage device of a computer that already includes an existing operating system, the new operating system overwrites all data associated with the existing operating system. Alternatively, users may install the new operating system on a new partition of the storage device, and install a boot loader to provide a dual-boot system that enables a user to choose whether to run the original operating system or the new operating system when the computer is powered on. However, dual-boot systems are cumbersome, and require the user to restart the computer to switch between operating systems. Moreover, in dual-boot systems, one operating system may try to format the partition of the other operating system, and some operating systems do not operate well in a dual-boot environment.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
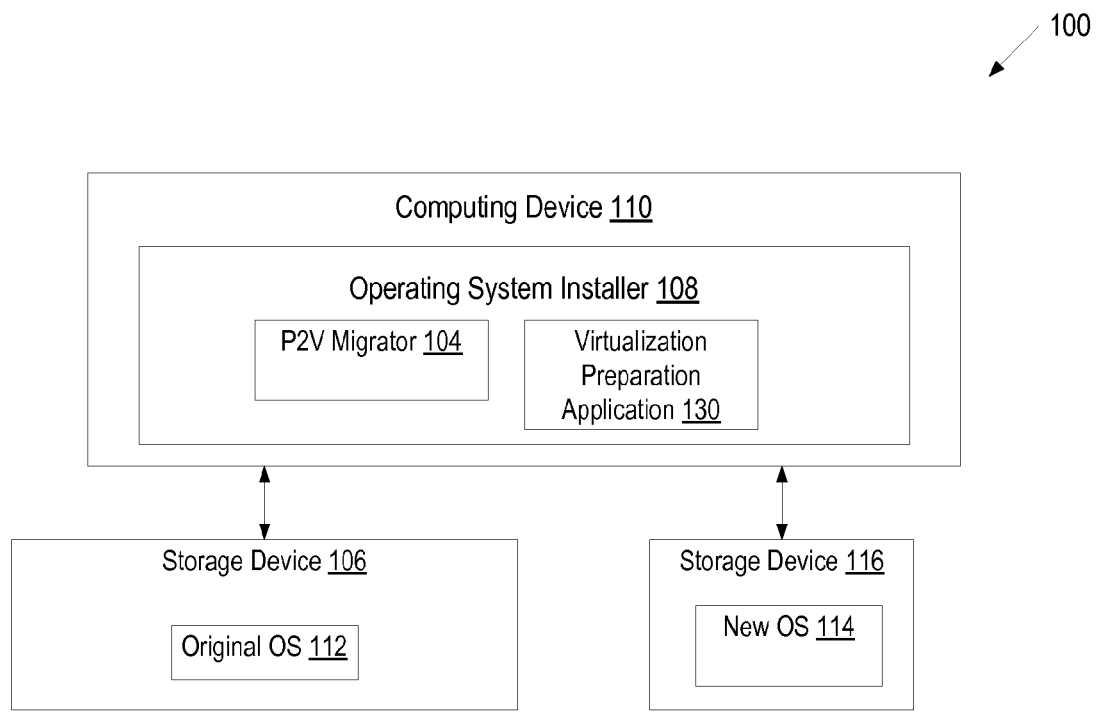
FIG. 1 illustrates a computer system that includes a computing device connected with a storage device and an optical drive, in accordance with one embodiment of the present invention.

Described herein is a method and system for performing physical to virtual (P2V) migration during installation of an operating system. In one embodiment, a computing device executing an operating system installer generates a virtual disk image at a temporary location. The computing device then copies data from one or more existing partitions on a storage device to the virtual disk image, wherein the one or more existing partitions include an existing operating system and associated data. In one embodiment, the one or more existing partitions are reduced in size prior to generating the virtual disk image. The one or more existing partitions are replaced with a new partition on the storage device, and a new operating system is installed on the new partition. The virtual disk image is then moved to the new partition from the temporary location. The virtual disk image can then be loaded into a virtual machine managed by the new operating system. Thus, the existing operating system can be virtualized in-place, and moved onto a filesystem of a newly installed operating system. This enables a user to preserve all existing files, documents, applications, etc. that the user had on the original operating system without performing any backup prior to installing the new operating system. Moreover, the entire original operating system can still be used within a virtual machine when desired.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating", "copying", "replacing", "installing", "preparing", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, compact disc-read only memories (CD-ROMs), and magnetic-optical disks, read-only memories (ROMs), random access memories (RAMs), erasable programmable read only memories (EPROMs), electrically erasable programmable read only memories (EEPROMs), magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

FIG. 1 illustrates a computer system 100 that includes a computing device 110 connected with a storage device 106 and a storage device 116, in accordance with one embodiment of the present invention. The computing device 110 may be a notebook computer, desktop computer, server computer, personal digital assistant (PDA), mobile phone, or other computing device. The computing device 110 includes an operating system installer 108 that has been loaded into memory of the computing device 110 and/or that is executing on the computing device 110. In one embodiment, the operating system installer 108 is loaded into memory/executed from the storage device 116 that is connected with the computing device 110. The storage device 116 may be an optical drive, a universal serial bus (USB) drive, a hard disk drive, or another storage device. The storage device 116 may be a local storage device directly connected with computing device 110, or a remote storage device connected with computing device 110 via a network. The operating system installer 108 may install a new operating system (OS) 114 from storage device 116 onto the storage device 106.

The storage device 106 may be a hard disk drive, solid state drive, network storage device, or other form of secondary storage. The storage device 106 includes an original operating system (OS) 112. A conventional operating system installer would overwrite the original OS 112 and all other data stored on a storage device when installing the new OS 114. However, the operating system installer 108 includes a physical to virtual (P2V) migrator 104 that is configured to virtualize the original OS 112 and accompanying data before the new OS 114 is installed. The P2V migrator 104 generates a virtual disk image of the original OS 112 (including additional files, documents, applications, etc. associated with the original OS 112), installs the new OS 114, and copies the virtual disk image to a location managed by the new OS 114 (e.g., to a partition on which the new OS 114 has been installed, or another partition having a format supported by the new OS 114). Once the virtual disk image is copied to a location managed by the new OS 114, the original OS 112 can be booted up from the virtual disk image into a virtual machine managed by the new OS 114. The original OS 112 can therefore become a guest operating system (an operating system that runs on a virtual machine). Thus, the operating system installer 108 can preserve the original OS 112 during installation of the new OS 114.

In one embodiment, the operating system installer 108 includes a virtualization preparation application 130 that prepares the original OS 112 for virtualization prior to performing P2V migration of the original OS. In one embodiment, the virtualization preparation application 130 is executed from within the original OS 112 while the original OS is running.

One embodiment of the virtualization preparation application is described in greater detail below with reference to FIG. 4.

Figure 2:
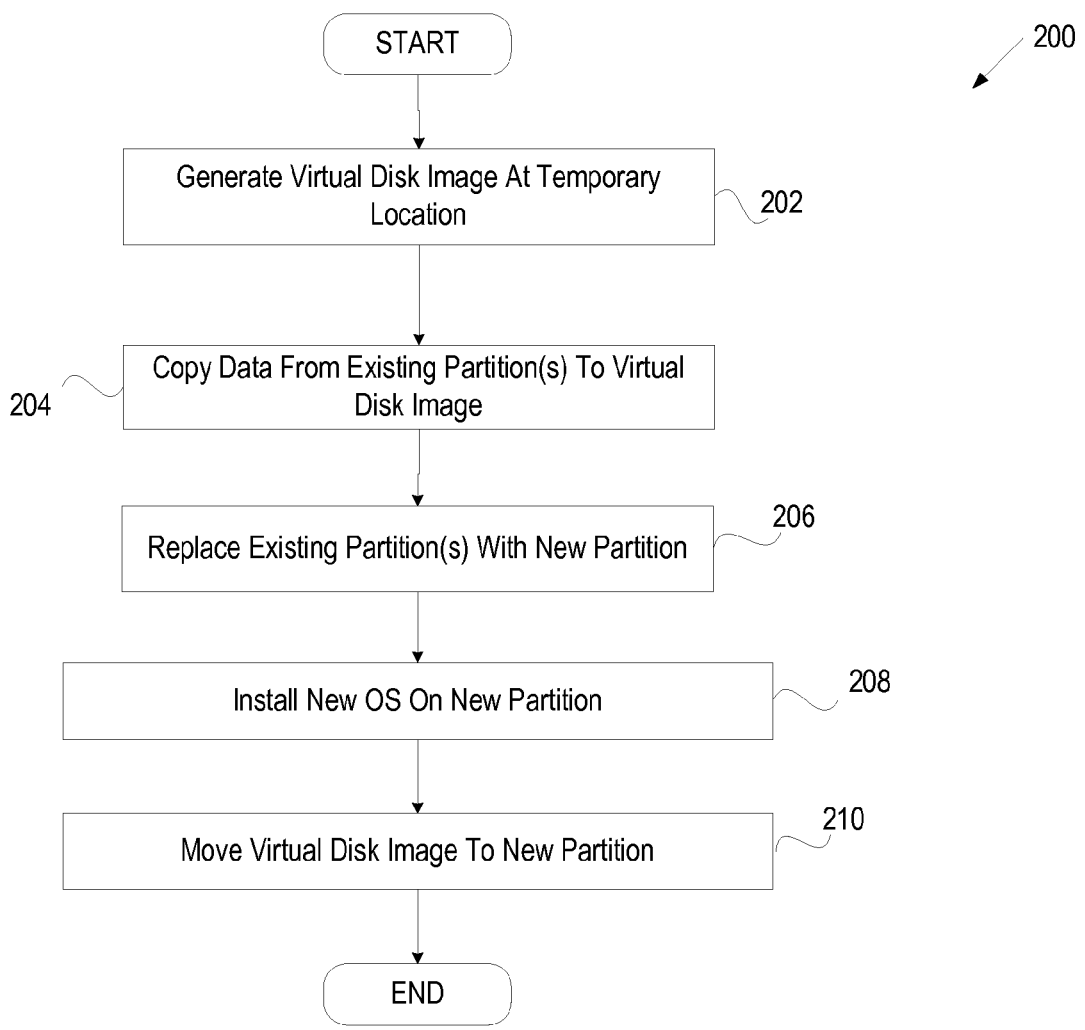
FIG. 2 is a flow diagram illustrating one embodiment of a method for performing an in-place P2V migration during installation of a new OS.

FIG. 2 is a flow diagram illustrating one embodiment of a method 200 for performing an in-place P2V migration during installation of a new OS. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 200 is performed by Operating System Installer 108 of FIG. 1. In a further embodiment, method 200 is performed by P2V migrator 104 of FIG. 1.

Referring to FIG. 2, at block 202 of method 200 an OS installer (or application included in OS installer) generates a virtual disk image at a temporary location. The temporary location may be an existing partition or a new temporary partition of a storage device. A virtual disk image is a file that contains the contents and structure representing a storage device (e.g., a disk drive). From the perspective of a guest OS (of a virtual machine), the virtual disk image is an actual disk drive. Therefore, the guest OS can create and/or manage its own filesystem on the virtual disk. In one embodiment, the virtual disk image is generated by creating a file having a virtual disk image file format.

In one embodiment, the virtual disk image is a dynamically expanding virtual disk generated at the temporary location using a copy-on-write image format. A virtual disk image generated using a copy-on-write image format grows as data is written to it, and consumes a minimum amount of storage space. In other embodiments, other disk image formats may be used, such as a fixed-size virtual disk image format, in which the disk size is determined when the virtual disk image is created, or a differencing virtual disk image format, in which all changes to the virtual disk image are recorded. Examples of virtual disk image formats include Acronis'® ".tib" image format, VMWare's® ".vmdk" image format, Window's® ".vhd" file format, the ".img" image format, QEMU's® ".qcow2" image format, etc.

At block 204, the OS installer copies data from one or more existing partitions of a storage device to the virtual disk image. The one or more existing partitions may include an original OS (e.g., a Windows® OS, Linux® OS, etc.) and additional data. The existing partitions may have a filesystem format supported by the original OS. For example, if the original OS is a Windows® OS, the existing partitions may have a "FAT32", "FAT16", "NTFS", or other supported filesystem formats. The copied data may be a bit by bit clone of the data stored on the one or more partitions of the storage device. Accordingly, the virtual disk image may have virtual partitions that are formatted according to the filesystem formats of the existing partitions. The copied data may also be compressed, encrypted and/or otherwise manipulated as the data is copied to the virtual disk image and/or after the data has been copied to the virtual disk image.

At block 206, the OS installer replaces the existing partitions of the storage device with a new partition. The new partition is generated using a filesystem format supported by the new OS that will be installed by the OS installer. For example, if the new OS is a Linux® OS, the new partition may have a "ext", "ext2", "jfs" or other filesystem format. At block 208, the new OS is installed on the new partition. In one embodiment, installing the new OS includes creating a virtual machine that runs on the new OS. The virtual machine can be created by installing virtual machine software, and generating a virtual machine file (representing a virtual computing device) that can be loaded with the virtual machine software. The virtual machine file may be automatically generated on installation of the OS. Generating the virtual machine file may include detecting hardware resources of an underlying computing device, and generating virtual resources that mimic the hardware resources.

At block 210, the virtual disk image is moved from the temporary location to the new partition. Thereafter, the virtual disk image may be loaded within the virtual machine, and the original OS may be a guest OS of the virtual machine. Accordingly, the original OS and all associated applications, files and documents may still be used after the new OS is installed.

Figure 3A:
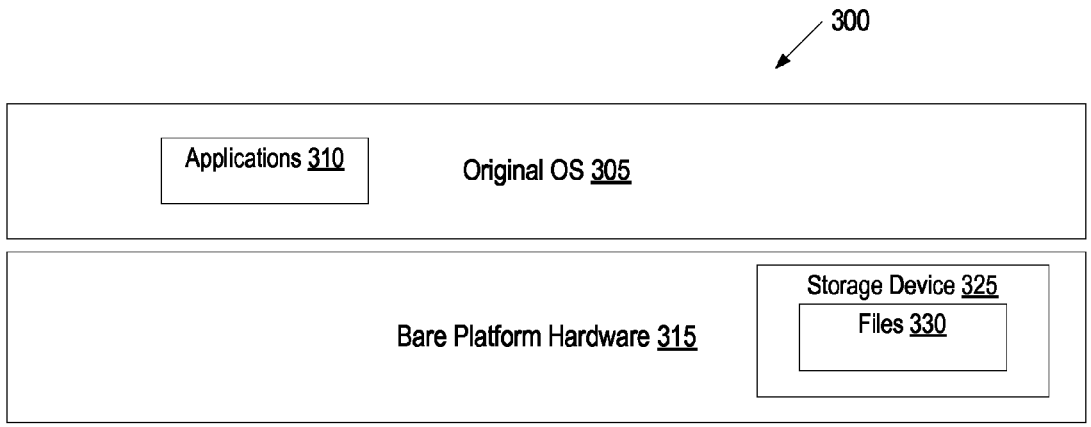
FIG. 3A illustrates a computer system before installation of a new OS, in accordance with one embodiment of the present invention.
Figure 3B:
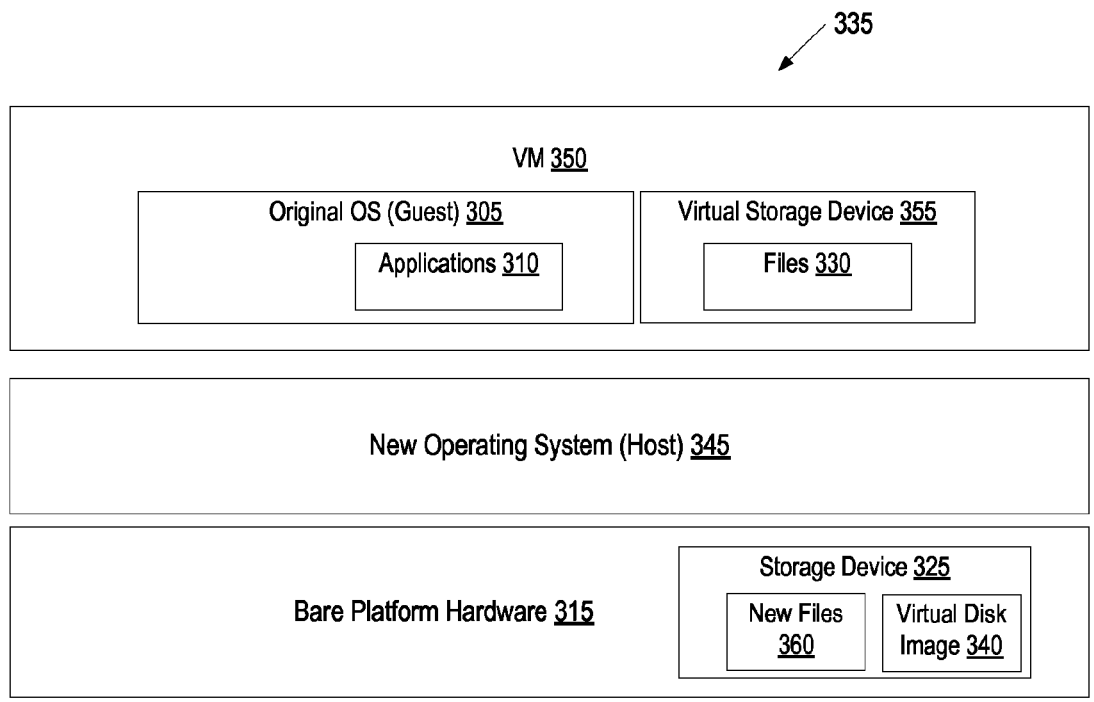
FIG. 3B illustrates a computer system after installation of a new OS, in accordance with one embodiment of the present invention.

FIGS. 3A-3B illustrate a computer system 300 before installation of a new OS and the computer system 335 after installation of the new OS, respectively, in accordance with one embodiment of the present invention. FIG. 3A shows one example computer system before execution of method 200 of FIG. 2. The computer system 300 of FIG. 3A includes a bare platform hardware 315 that includes a processor (not shown), main memory (not shown), bus (not shown), storage device 325, etc. The storage device 325 includes one or more files 330, which include data for loading and executing an original OS 305. The original OS 305 runs on the bare platform hardware 315, and includes one or more applications 310, which are also included in files 330.

FIG. 3B shows the same platform hardware 315 of FIG. 3A (including storage device 325) after method 200 of FIG. 2 has been performed, in accordance with one embodiment of the present invention. In FIG. 3B, storage device 325 includes new files 360 and a virtual disk image 340. The new files 360 include files for a new operating system (345) and a virtual machine 350 managed (controlled) by the new OS 345. The virtual disk image 340 includes the original files 330, including applications 310 and OS 305.

The new OS 345 runs on the bare platform hardware 315, and in one embodiment acts as a host (also known as a hypervisor or virtual machine monitor). A virtual machine monitor (VMM), though typically implemented in software, may emulate and export a bare machine interface to higher level software. A VMM presents to other software (i.e., "guest" software) the abstraction of a virtual machine (VM) 350, which may provide the same or different abstractions to a guest operating system. The virtual machine 350 is managed by the new OS 345, and executes the original OS 305, which acts as a guest OS. In one embodiment, the VM 350 presents to the guest OS a virtual storage device 355, which includes all of the original files 330. The virtual storage device 355 in one embodiment corresponds to virtual disk image 340.

Figure 4:
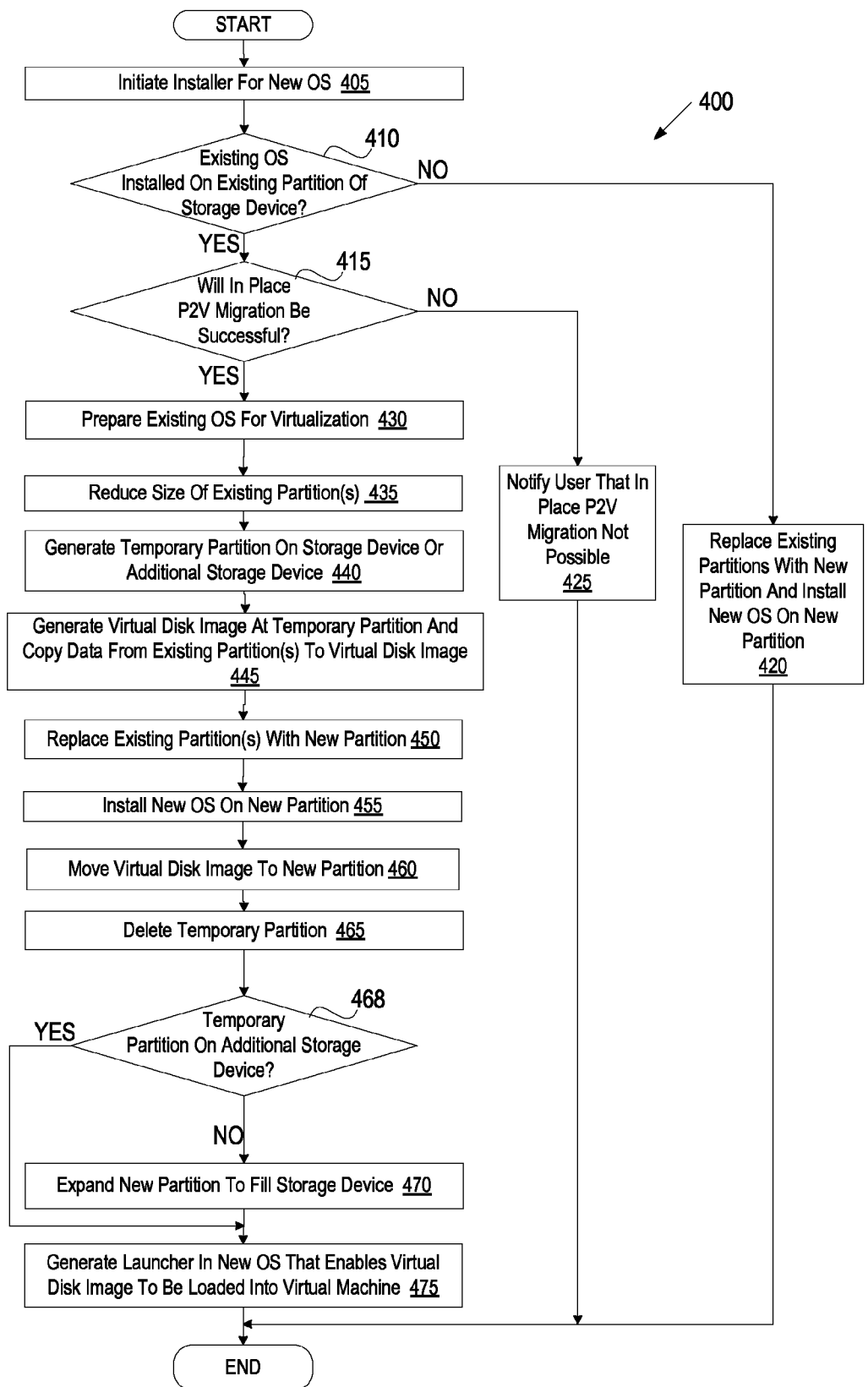
FIG. 4 is a flow diagram illustrating another embodiment of a method for performing an in-place P2V migration during installation of a new OS.

FIG. 4 is a flow diagram illustrating another embodiment of a method 400 for performing an in-place P2V migration during installation of a new OS. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 400 is performed by Operating System Installer 108 of FIG. 1, which may include P2V migrator 104 and/or virtualization preparation application 130.

Referring to FIG. 4, at block 405 of method 400 an OS installer for a new OS is initiated. The OS installer may include multiple different applications, such as a virtualization preparation application, a P2V migrator, and other applications. In one embodiment, the OS installer is initiated by booting up a computer system from an optical disk that includes the OS installer and the new OS. In other embodiments, the OS installer may be initiated from a remote network location, from a USB drive, etc. Alternatively, the OS installer is executed from an existing OS that is in operation. In such an embodiment, at least one application of the OS installer has an executable format supported by the existing OS.

At block 410, the OS installer determines whether there is an existing OS installed on an existing partition of a storage device onto which the new OS will be installed. If there is an existing OS, the method continues to block 415. If there is no existing OS, the method continues to block 420.

At block 420, the OS installer replaces one or more existing partitions on the storage device with one or more new partitions, and installs the new OS on one of the one or more new partitions. The method then ends.

At block 415, the OS installer verifies that in-place migration of the existing OS will be successful. Such verification may include, for example, determining whether there is enough storage space on the storage device (or on an additional storage device) to generate a temporary partition that is large enough to hold a virtual disk image of the OS and all associated data. If the OS installer determines that the P2V migration may fail, the method proceeds to block 425, and the OS installer notifies a user that in-place P2V migration is not possible, ending execution of method 400. The OS installer may also instruct the user to install an additional storage device. If the installer determines that the P2V migration will be successful, the method continues to block 430.

At block 430, the OS installer prepares the existing OS for virtualization. In one embodiment, block 430 is performed by virtualization preparation application 130 of FIG. 1. Operating systems include various system-specific parameters that may become invalid once the OS is virtualized. These parameters may become invalid because the OS has a different identity once it is virtualized. Accordingly, in one embodiment, preparing the existing OS for virtualization includes disassociating the existing operating system from physical hardware. This may include generalizing a computer name of the existing OS, generalizing a security identifier (ID), generalizing a driver cache, etc. Therefore, once the OS is virtualized, a new security ID, new computer name and new driver cache may be created.

Preparing the OS for virtualization may also include removing unnecessary data from the one or more existing partitions. For example, preparing the OS for virtualization may include removing temporary files and removing swap files. Preparing the OS for virtualization may also include identifying resources and applications installed on the existing OS, identifying documents and other files on the one or more existing partitions that can be used by the new OS, and/or performing other tasks. In one embodiment, a configuration file is generated by the virtualization preparation application. The configuration file may identify documents and files that can be run natively on the new OS, applications installed on the original OS, data included in the original OS, etc. The configuration file may be used later in the OS installation process.

In one embodiment, the existing OS is prepared for virtualization by loading the existing OS (if the OS installer was not executed from an already running OS) and running a virtualization preparation application (which may be a component of the OS installer, or a native application of the OS that is called by the OS installer). For example, a Windows OS includes a tool called "sysprep" that can prepare a Windows OS for virtualization. A user may manually execute the virtualization preparation application, or the virtualization preparation application may be executed automatically upon the original OS booting up, or upon the user executing the OS installer on the existing OS.

After the original OS is prepared for virtualization, the system is rebooted into the OS installer. At block 435, the existing partition or partitions of the storage device are reduced in size to be as small as possible by the OS installer. For example, the partition or partitions may be shrunk so that they do not include any unused storage space. Prior to shrinking the partitions, the partitions may be defragmented to increase the efficiency of space utilization. The partitions may also be compressed to further reduce their size. If unnecessary files (e.g., swap files, duplicate files, temporary files, browser cache/history, virtual memory pages, etc.) were not deleted during virtualization preparation of the existing OS, such unnecessary files may also be deleted at block 435.

After the existing partitions are reduced in size, at block 440 the OS installer generates a temporary partition on the storage device or on an additional storage device. This temporary partition may be generated at the end of the storage device, at the end of the existing partition or partitions, or at some other designated location (e.g., at a specified location of the additional storage device). The temporary partition in one embodiment has a size that is equivalent to the total size of the shrunk existing partitions. Alternatively, the temporary partition may have a predetermined size, which may subsequently be shrunk or expanded as necessary as data is copied to a virtual disk image from the existing partitions. In one embodiment, the temporary partition has a filesystem format that is supported by the new OS that will be installed.

At block 445, the OS installer generates a virtual disk image on or at the temporary partition. The OS installer then copies data from the existing partitions to the virtual disk image. Once all data has been copied from the existing partitions to the virtual disk image, the size of the temporary partition may be reduced if the temporary partition has any unused storage space. In one embodiment, the temporary partition is expanded incrementally while periodically shrinking the existing partition or partitions as data is copied from the partition(s) to the virtual disk image. The incremental expansion may be performed when there is limited storage space on the storage device.

At block 450, the OS installer replaces the existing partitions of the storage device with a new partition. The new partition is generated using a filesystem format supported by the new OS that will be installed by the OS installer. In one embodiment, the new partition is generated at the beginning of the storage device. At block 455, the new OS is installed on the new partition. At block 460, the virtual disk image is moved from the temporary partition to the new partition. At block 465, the temporary partition is deleted.

At block 468, the OS installer determines whether the temporary partition was generated on the same storage device as the new partition. If the temporary partition was generated on an additional (different) storage device, the method proceeds to block 475. If the temporary partition was generated on the same storage device as the new partition, the method continues to block 470, and the new partition is expanded to fill the storage space of the storage device.

In one embodiment, the OS installer installs a virtual machine for use on the new OS. The virtual machine supports the virtual disk image format that was used to generate the virtual disk image. At block 475, a launcher is generated in the new OS that enables the virtual disk image to be loaded into a virtual machine. A link to the launcher may be placed on a desktop of the new OS, in a start menu, etc. Therefore, the user may easily launch the virtual machine and the original OS by a simple press of a button.

In one embodiment, the OS installer identifies what applications were originally installed on the original OS, and generates separate launchers for one or more of those applications. This identification may be made using the configuration file previously generated. These separate launchers may be run to automatically start the virtual machine, original OS, and associated application within the original OS by a simple press of a button.

In one embodiment, the OS installer determines what documents and files included in the original partitions can be used natively in the new OS. For example, the openoffice.org writer application that runs on a Linux machine can read and write ".doc" files. Accordingly, Linux OSes can have native support for using ".doc" files. The determination of which files and documents can be run natively on the new OS may be made using the configuration file previously generated. The OS installer may then set up a file sharing mechanism that enables applications of the new OS to access those documents and files from the original partition(s) that have native support in the new OS. In one embodiment, the file sharing mechanism includes an additional partition that is accessible to both the original OS (as a guest OS) and the new OS (as a host OS).

The method then ends.

Figure 5:
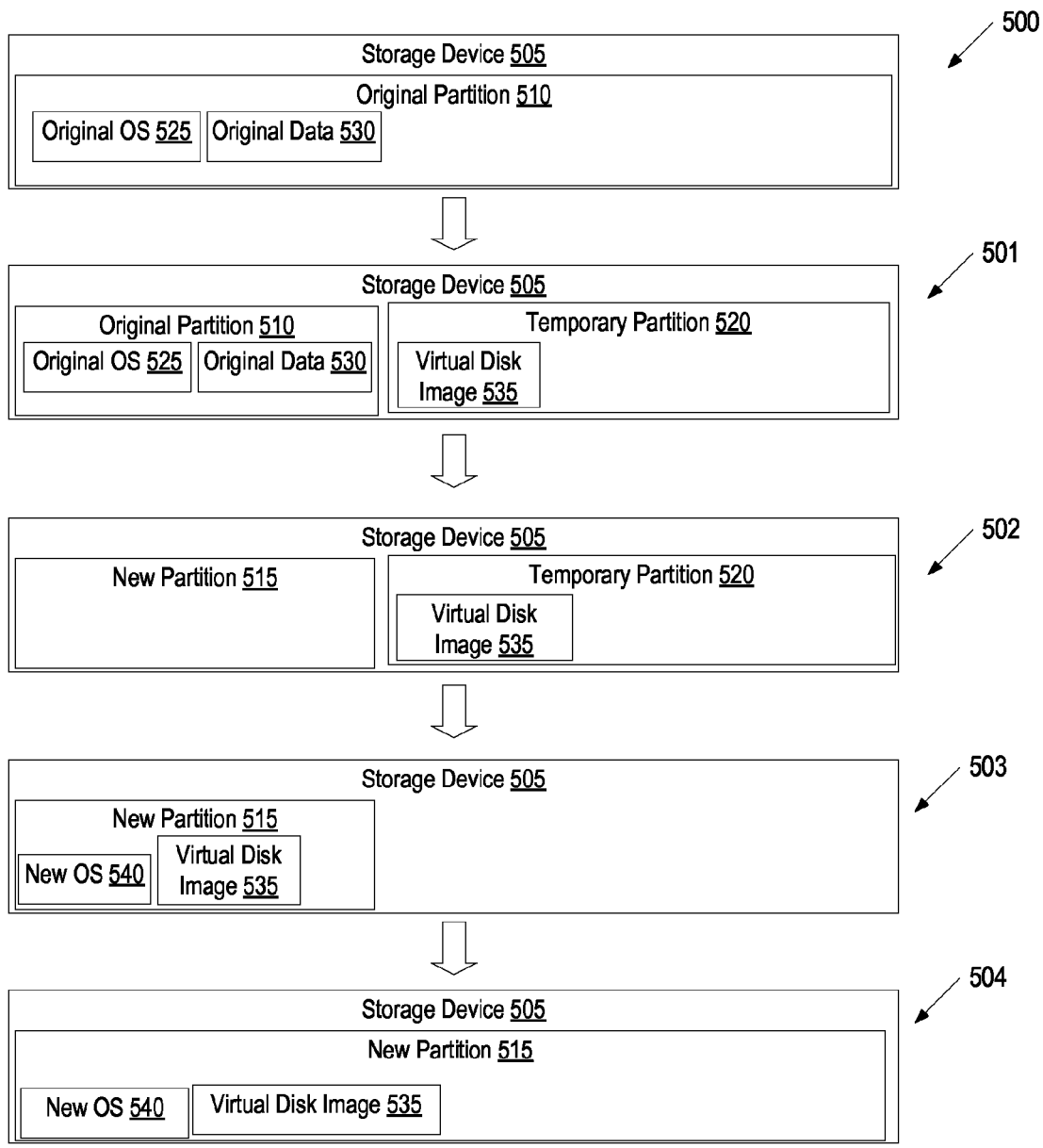
FIG. 5 illustrates a storage device at various stages of installation of a new OS onto the storage device.

FIG. 5 illustrates a storage device 505 at various stages of installation of a new OS onto the storage device 505. In one embodiment, FIG. 5 shows stages of installation of a new OS on storage device 505 after various blocks of method 400 have completed processing. The storage device 505 has a first state 500 before the new OS is installed. In the first state 500, the storage device 505 includes an original partition 510 that includes an original OS 525 and original data 530.

The original partition 510 in the example storage device 505 initially has a considerable amount of unused storage space. To make room for a temporary partition, the original partition 510 is shrunk. A temporary partition is then generated on the storage device 505. A virtual disk image is generated in the temporary partition, and the original OS 525 and original data 530 are copied into the virtual disk image. Second state 501 of storage device 505 shows that the original partition 510 has shrunk, that temporary partition 520 has been generated, and that virtual disk image 535 has been created in the temporary partition 520. In one embodiment, the second state 501 corresponds to a state of the storage device 505 after block 445 of method 400 has completed processing.

In one embodiment, third state 502 corresponds to a state of the storage device 505 after block 450 of method 400 has completed processing. As shown in third state 502 of storage device 505, the original partition 510 is replaced with new partition 515.

In one embodiment, fourth state 503 corresponds to a state of storage device 505 after block 460 of method 400 has completed processing. As shown in fourth state 503 of storage device 505, a new OS 540 is installed on the new partition 515, and the virtual disk image 535 is moved onto the new partition 515. The temporary partition 520 is then deleted after the virtual disk image 535 has been moved.

In one embodiment, fifth state 504 corresponds to the state of storage device 505 after block 470 of method 400 has completed processing. As shown in fifth state 504 of storage device 505, once the temporary partition 520 is deleted, the new partition 515 is expanded to take up the entire storage device.

Figure 6:
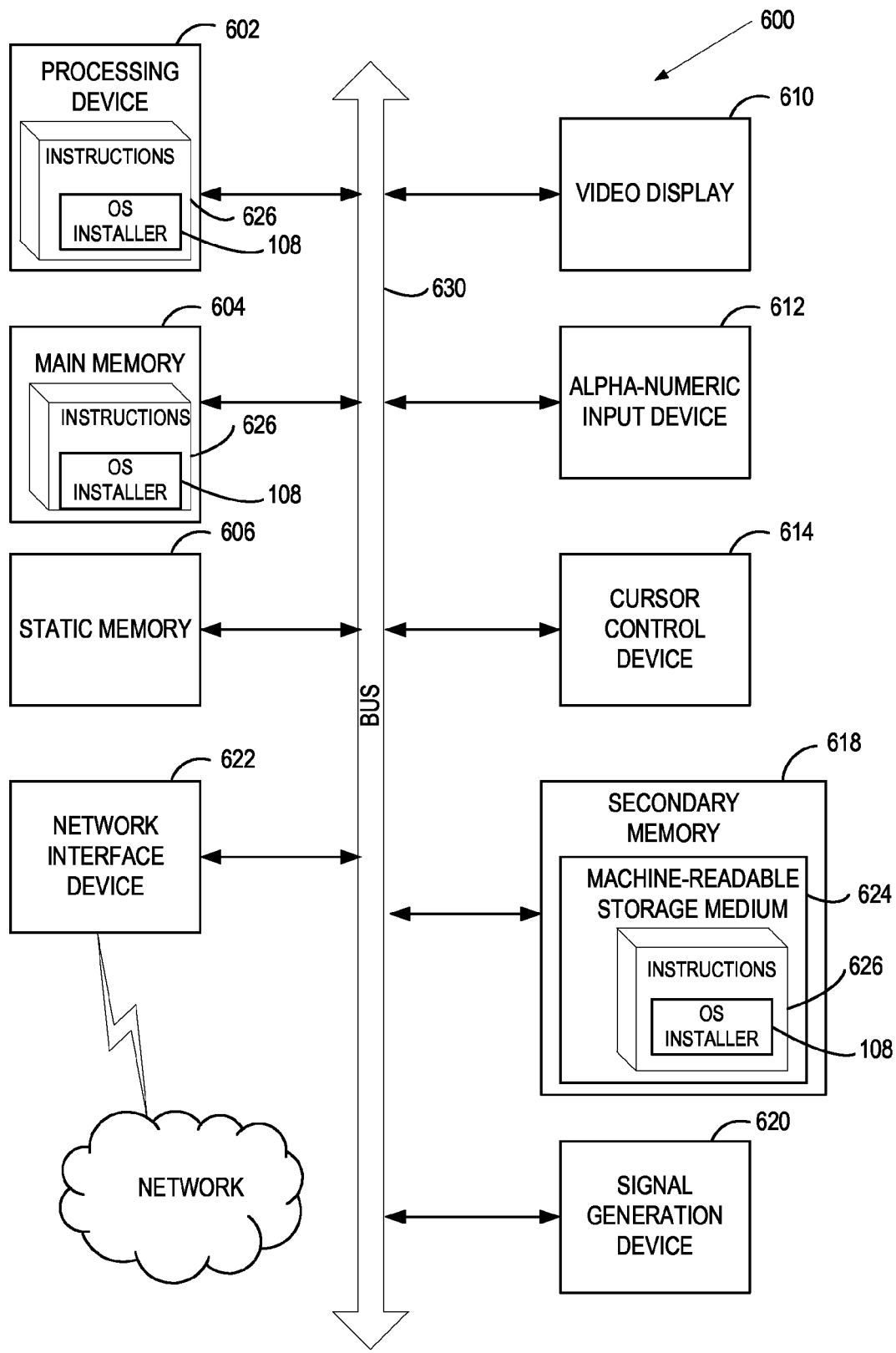
FIG. 6 illustrates a diagrammatic representation of a machine in the exemplary form of a computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processing device 602 represents one or more general-purpose processing devices such as a microprocessor, central processing unit (CPU), or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 618 may include a machine-readable storage medium (or more specifically a computer-readable storage medium) 624 on which is stored one or more sets of instructions 626 (e.g., software) embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

The machine-readable storage medium 624 may also be used to store the OS installer 108 of FIG. 1, and/or a software library containing methods that call the OS installer 108. While the machine-readable storage medium 624 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of ordinary skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   generating, at a temporary location and by a computing device executing an operating system installer, a virtual disk image configured to be loaded into a virtual machine;
   copying data from an existing partition on a storage device to the virtual disk image, wherein the copied data comprises an existing operating system;
   replacing the existing partition with a new partition on the storage device;
   installing a new operating system on the new partition; and
   moving the virtual disk image to the new partition from the temporary location.

2. The method of claim 1, further comprising:
   reducing a size of the existing partition prior to generating the virtual disk image.

3. The method of claim 1, further comprising:
   detecting that the existing operating system is installed on the existing partition; and
   automatically generating the virtual disk image upon detecting that the existing operating system is installed.

4. The method of claim 1, further comprising:
   disassociating the existing operating system from physical hardware prior to generating the virtual disk image.

5. The method of claim 4, wherein disassociating the existing operating system from physical hardware comprises at least one of generalizing a computer name, generalizing a security identifier, generalizing a driver cache, removing temporary files, removing swap files, identifying resources and applications installed on the existing operating system, or identifying documents and other files on the existing partition that can be used by the new operating system.

6. The method of claim 1, wherein the temporary location is a temporary partition on the storage device, the method further comprising:
   generating the temporary partition prior to generating the virtual disk image;
   deleting the temporary partition after moving the virtual disk image to the new partition; and
   expanding the new partition to fill the storage device after deleting the temporary partition.

7. The method of claim 1, further comprising:
automatically generating a launcher in the new operating system that enables the virtual disk image to be loaded into the virtual machine.

8. The method of claim 1, further comprising:
confirming that there will be enough space on the storage device to store the virtual disk image and to install the new operating system.

9. A non-transitory computer readable storage medium having instructions encoded thereon that, when executed by a processing device, cause the processing device to perform operations comprising:
generating, at a temporary location and by the processing device during execution of an operating system installer, a virtual disk image configured to be loaded into a virtual machine;
copying data from an existing partition on a storage device to the virtual disk image, wherein the copied data comprises an existing operating system;
replacing the existing partition with a new partition on the storage device;
installing a new operating system on the new partition; and
moving the virtual disk image to the new partition from the temporary location.

10. The non-transitory computer readable storage medium of claim 9, the operations further comprising:
reducing a size of the existing partition prior to generating the virtual disk image.

11. The non-transitory computer readable storage medium of claim 9, the operations further comprising:
detecting that the existing operating system is installed on the existing partition; and
automatically generating the virtual disk image upon detecting that the existing operating system is installed.

12. The non-transitory computer readable storage medium of claim 9, the operations further comprising:
disassociating the existing operating system from physical hardware prior to generating the virtual disk image.

13. The non-transitory computer readable storage medium of claim 9, wherein the temporary location is a temporary partition on the storage device, the operations further comprising:
generating the temporary partition prior to generating the virtual disk image;
deleting the temporary partition after moving the virtual disk image to the new partition; and
expanding the new partition to fill the storage device after deleting the temporary partition.

14. The non-transitory computer readable storage medium of claim 9, the operations further comprising:
automatically generating a launcher in the new operating system that enables the virtual disk image to be loaded into the virtual machine.

15. The non-transitory computer readable storage medium of claim 9, the operations further comprising:
confirming that there will be enough space on the storage device to store the virtual disk image and to install the new operating system.

16. A computing device, comprising:
a storage device that comprises an existing partition;
a memory to store instructions for an operating system installer; and
a processing device, connected with the memory and the storage device, to execute the instructions, wherein the instructions cause the processing device to:
generate a virtual disk image at a temporary location on the storage device or on an additional storage device;
copy data from the existing partition on the storage device to the virtual disk image, wherein the copied data comprises an existing operating system;
replace the existing partition with a new partition on the storage device;
install a new operating system on the new partition; and
move the virtual disk image to the new partition from the temporary location, wherein the virtual disk image is to be loaded into a virtual machine managed by the new operating system.

17. The computing device of claim 16, wherein the instructions further cause the processing device to reduce a size of the existing partition prior to generating the virtual disk image.

18. The computing device of claim 16, wherein the instructions further cause the processing device to detect that the existing operating system is installed on the existing partition and to automatically generate the virtual disk image upon detecting that the existing operating system is installed.

19. The computing device of claim 16, wherein the instructions further cause the processing device to disassociate the existing operating system from physical hardware prior to generating the virtual disk image.

20. The computing device of claim 16, wherein the temporary location is a temporary partition on the storage device, wherein the instructions further cause the processing device to generate the temporary partition prior to generating the virtual disk image, to delete the temporary partition after moving the virtual disk image to the new partition, and to expand the new partition to fill the storage device after deleting the temporary partition.

21. The computing device of claim 16, wherein the instructions further cause the processing device to automatically generate a launcher in the new operating system that enables the virtual disk image to be loaded into the virtual machine.

22. The computing device of claim 16, wherein the instructions further cause the processing device to confirm that there will be enough space on the storage device to store the virtual disk image and to install the new operating system.

23. The method of claim 1, further comprising loading the virtual disk image into a virtual machine managed by the new operating system.

24. The method of claim 1, wherein the copied data comprises additional data associated with the operating system.

25. The method of claim 1, wherein the copied data comprises all of the data on the existing partition.

* * * * *